United States Patent Office 3,288,857
Patented Nov. 29, 1966

3,288,857
OXO PROCESS
Harold E. Kyle, St. Albans, W. Va., and Marvin Echols, Victoria, Tex., assignors to Union Carbide Corporation, a corporation of New York
No Drawing. Filed Apr. 9, 1962, Ser. No. 185,831
3 Claims. (Cl. 260—604)

This invention relates to the preparation of organic compounds by the so-called oxo process wherein carbon monoxide and hydrogen are reacted with an olefinic compound in the presence of a cobalt-containing carbonylation catalyst. More particularly this invention relates to a method of treating the cobalt salts, e.g., cobalt formate, produced during the foregoing reaction whereby said cobalt salts are converted to cobalt acetate.

It is well known in the art that olefinically unsaturated compounds can be reacted with synthesis gas (carbon monoxide and hydrogen) in a reaction zone with a Group VIII metal-containing catalyst such as iron or cobalt, preferably the latter, to produce organic oxygenated compounds, for example, aldehydes which contain one more carbon atom than the starting olefin. According to one method, for example, the effluent from said reaction zone is contacted with an aqueous solution of a lower carboxylic acid, e.g., acetic acid, in a distillation zone, at a temperature sufficient to decompose the cobalt carbonyl which is formed in the reaction zone. The aldehydes are thus removed by distillation from said distillation zone, and an aqueous solution comprising metal cobalt, cobalt-containing compounds, e.g., cobalt acetate, cobalt formate, etc., and said lower carboxylic acid (acetic acid) is withdrawn, generally from the base of said distillation zone. This solution which will hereinafter be referred to as the cobalt-containing aqueous solution is generally treated in a catalyst treating zone to recover the cobalt and/or cobalt-containing compounds which are eventually returned to the reaction zone for further use. The aldehydes produced may be hydrogenated to the corresponding alcohols or they may be oxidized to the corresponding organic carboxylic acids.

The foregoing reaction generally includes several other side reactions one of which is the formation of formic acid from carbon monoxide and water (produced during the course of the reaction). The formic acid reacts with the cobalt in the said cobalt-containing aqueous solution to produce cobalt formate which is highly insoluble in the reaction product mixture and only slightly soluble in water, and precipitates in the system, particularly in the catalyst recovery zone. The formation of the oil-insoluble cobalt formate (and cobalt metal), therefore, seriously interferes with the operation of the system by necessitating frequent shut-downs for the purpose of cleaning the equipment. Thus the removal of cobalt formate, etc., is highly desirable and, in fact, necessary for continuous operation of the process.

Several methods have heretofore been proposed for the solution of this problem. One method resorts to decobalting with sulfuric acid. According to this method, the cobalt-containing aqueous solution is treated with sulfuric acid solution to convert the cobalt-containing compounds into cobalt sulfate solution. The latter is converted to the hydroxide by treatment with alkali and the hydroxide is then treated with acetic acid to form cobalt acetate which is soluble in the reaction mixture and in the catalyst recovery zone. This stepwise procedure however is complicated, costly, and cumbersome. Another method resorts to water injection in, for example, the catalyst recovery zone in order to disperse the insoluble cobalt salts, e.g., cobalt formate, and to form a slurry thereof which could be transported more readily. This method however offers several limitations, particularly in commercial operations. The volume of water which is injected into the catalyst recovery zone is usually large, therefore necessitating the use of large and expensive equipment. Furthermore, water injection reduces the reaction rate and the production capacity of the unit, and necessitates large quantities of heat in the catalyst recovery zone to remove the water therefrom. Other solutions have been proposed but they are deficient in one way or another.

We have now discovered that the foregoing difficulties can be essentially eliminated by converting the relatively insoluble cobalt-containing compounds, such as cobalt formate, in said cobalt-containing aqueous solution, to a soluble cobalt salt, i.e., cobalt acetate. According to our invention, the said cobalt-containing aqueous solution is contacted with a lower aliphatic alcohol in a catalyst contacting zone using conventional equipment. We have found unexpectedly that said alcohol reacts with the formate ion from said cobalt formate to form alkyl formate which is removed from the reaction mixture by distillation, thus permitting essentially quantitative conversion of cobalt formate to cobalt acetate in the catalyst contacting zone. Using butyl alcohol, for example, the above reaction may be represented as follows:

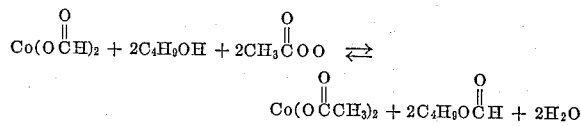

The presence of alcohol in the above reaction facilitates the removal of formate ion from cobalt formate to produce butyl formate which can be readily removed by distillation. As more formate ions are removed from cobalt formate, the equilibrium reaction favors the formation of cobalt acetate providing, however, the butyl formate is removed continuously from the reaction mixture.

According to our invention the cobalt-containing aqueous solution and the alcohol are charged to a suitable distillation apparatus and the resulting admixture is heated for a period of time sufficient to convert substantially all the cobalt formate to cobalt acetate. Sufficient quantity of extraneous acetic acid may be added to said admixture, if necessary, to insure essentially complete conversion of cobalt formate to cobalt acetate. The alkyl formate which is produced in the course of the reaction is removed continuously by distillation. The alcohol, acetic acid and cobalt formate are generally present in stoichiometric ratios, though we prefer to use a stoichiometric excess of acetic acid and aliphatic alcohol to insure substantially complete conversion of cobalt formate to cobalt acetate.

The alcohols which are employed in the novel process are generally the aliphatic alcohols, e.g., alkanols, preferably containing 1 to 7 carbon atoms or more, for example, methyl alcohol, ethyl alcohol, n-propyl alcohol, isopropyl alcohol, n-butyl alcohol, isobutyl alcohol, n-pentyl alcohol, 2-methylbutyl alcohol, n-hexyl alcohol, and the like, or mixtures of these alcohols. Especially preferred alcohols are those which contain from 3 to 5 carbon atoms. Butanol is highly preferred.

The novel process is generally carried out at an elevated temperature, e.g., from about 50° C., and lower, to about 300° C., and higher, preferably in the range of about 100° C. to about 200° C., and more preferably under reflux conditions.

The novel process can be carried out at sub-atmospheric, atmospheric, or super-atmospheric pressures. Suitable results are obtained, however, by operating at atmospheric or superatmospheric pressures, preferably in the range of about 50 p.s.i.g. to about 315 p.s.i.g. We have discovered that operation at super-atmospheric pressure permits higher reaction temperatures which in turn accelerate the reaction rate, hence improving the conversion of cobalt formate to cobalt acetate.

The residence time required for a given degree of conversion of cobalt formate to cobalt acetate can vary depending upon the temperature and pressure, the type of alcohol employed, the quantity of materials charged, the size and capacity of equipment, the degree of conversion desired, and other operating variables which are employed in the process. In general, the residence time can vary from several minutes to several days, e.g., 30 minutes and shorter, to 100 hours or longer. Using ordinary laboratory batch distillation equipment (5-liter flask) reaction times of upward of about 70 hours were observed to achieve the desired degree of conversion of cobalt formate to cobalt acetate.

The equipment used for carrying out the novel process may be constructed of ordinary materials of construction, though we prefer using corrosion-resistant materials, e.g., stainless steel, due to the presence of acetic acid and other corrosive substances.

The novel process can be carried out continuously, semi-continuously, or in batchwise fashion. It is therefore readily amenable to commercial operation where continuous conversion of the insoluble cobalt formate to the soluble cobalt acetate is highly desirable.

The following examples serve to illustrate but not limit the scope of our invention.

*Example 1*

One thousand and five hundred grams of isobutyl alcohol and 1500 grams of cobalt-containing aqueous solution containing 97 grams cobalt acetate, 48 grams cobalt formate, 358 grams acetic acid, the remainder being primarily water, were charged to a 5-liter electrically heated flask equipped with a 20-tray Oldershaw distillation column. The mixture was heated to a reflux temperature of 94° C. at atmospheric pressure and was maintained thereat for 62 hours. Isobutyl formate which was formed during the reaction was removed as an azeotropic mixture with isobutyl alcohol and water. The content of the flask was analyzed at the termination of the heating period and was found to comprise cobalt acetate, unreacted cobalt formate, isobutyl alcohol, acetic acid and water. The ratio of cobalt acetate to cobalt formate in the reaction mixture was determined by laboratory chemical analysis and was found to increase from 0.703 prior to the reaction to 2.50 after 62 hours of heating at the above conditions, indicating a substantial conversion of cobalt formate to cobalt acetate.

*Example 2*

Example 1 was repeated using n-butyl alcohol instead of isobutyl alcohol. The quantities of reactants employed, the composition of the cobalt-containing aqueous solution, and the experimental conditions were exactly the same as those in Example 1 except the heating period was 70 hours. The ratio of cobalt acetate to cobalt formate was found to increase from 0.703 prior to reaction to 3.63 after termination of the heating period.

The foregoing examples illustrate that substantial conversion of cobalt formate to cobalt acetate can be obtained from the method of our invention.

*Example 3*

One thousand and two hundred grams of isobutyl alcohol and 1865 grams of cobalt-containing aqueous solution containing 225 grams acetic acid, 140 grams of cobalt formate, the remainder being primarily water, were charged to a 5-liter electrically heated flask equipped with a 20-tray Oldershaw distillation column. The mixture was heated to a reflux temperature of 94° C. at atmospheric pressure and heating was continued for 15 hours. Isobutyl formate which was formed during the reaction was removed overhead as an azeotropic mixture with isobutyl alcohol and water. The content of the flask was analyzed at the termination of the heating period and was found to comprise cobalt acetate, unreacted cobalt formate, isobutyl alcohol, acetic acid and water. The ratio of cobalt acetate to cobalt formate in the reaction mixture was determined by laboratory chemical analysis and was found to increase from 0 (there was no cobalt acetate in the cobalt-containing aqueous solution) prior to reaction to 0.103 after termination of the heating period.

*Example 4*

Example 3 was repeated using the same quantities of alcohol and cobalt-containing aqueous solution (same composition as in Example 3). However the mixture was heated to a reflux temperature of 135° C. at 75 p.s.i.g. pressure, and heating was continued for approximately 17 hours. The ratio of cobalt acetate to cobalt formate was found to increase from 0 before the reaction to 1.74 after termination of the heating period.

*Example 5*

Example 3 was repeated using the same quantities of alcohol and cobalt-containing aqueous solution (same composition as in Example 3). However the mixture was heated to a reflux temperature of 200° C. at 315 p.s.i.g. pressure and heating was continued for approximately 17 hours. The ratio of cobalt acetate to cobalt formate was found to increase from 0 before the reaction to 6.33 after termination of the heating period.

Examples 3, 4 and 5 illustrate the effect of increasing the reaction temperature. It is obvious, therefore, that increased reaction temperature improves the degrees of conversion of cobalt formate to cobalt acetate.

Butyl alcohol (normal and isobutyl) has been used in the foregoing examples merely to illustrate the method and operation of the inventive process. As we have previously pointed out, other lower aliphatic alcohols which preferably contain 1 to 7 carbon atoms may be employed satisfactorily. It is understood however that the temperature, pressure, as well as the residence time, can be varied depending upon the particular alcohol which is employed in the reaction. Such variations, however, are within the scope of knowledge of a person skilled in the art.

What is claimed is:

1. In the Oxo process wherein olefins, carbon monoxide and hydrogen are reacted in a carbonylation zone with a cobalt carbonylation catalyst under carbonylation conditions to produce a reaction product mixture containing aldehydic products which have at least one more carbon atom than said olefins; contacting said reaction product mixture with an aqueous solution of acetic acid under conditions sufficient to decompose said cobalt carbonylation catalyst; thereafter recovering said aldehydic products from the resulting cobalt-containing aqueous solution; the improvement which comprises contacting said cobalt-containing aqueous solution with isobutyl alcohol in a distillation zone at a temperautre of from about 50° C. to about 300° C. under at least atmospheric pressure whereby the cobalt formate in said cobalt-containing solution is essentially converted to cobalt acetate, while removing isobutyl formate from said distillation zone.

2. In the process of claim 1 wherein said aliphatic alcohol and acetic acid are employed in at least stoichiometric proportion for reaction with said cobalt formate.

3. In the process of claim 2 wherein the temperature range in said distillation zone is from about 100° C. to about 200° C. and the pressure range in said distillation zone is from about 50 p.s.i.g. to about 315 p.s.i.g.

References Cited by the Examiner

UNITED STATES PATENTS

| 2,757,204 | 7/1956 | Ratcliff | 260—604 |
| 2,763,693 | 9/1956 | Vander Woude et al. | 260—604 |
| 2,767,048 | 10/1956 | Mertzweiller | 260—604 X |
| 2,812,356 | 11/1957 | Aldridge et al. | 260—604 |

LEON ZITVER, *Primary Examiner.*

J. J. SETELIK, R. H. LILES, *Assistant Examiners.*